(12) United States Patent
Lin et al.

(10) Patent No.: US 10,560,735 B2
(45) Date of Patent: Feb. 11, 2020

(54) MEDIA AUGMENTATION THROUGH AUTOMOTIVE MOTION

(71) Applicant: LP-RESEARCH INC., Tokyo (JP)

(72) Inventors: Zhuohua Lin, Tokyo (JP); Klaus Petersen, Tokyo (JP); Tobias Schlüter, Tokyo (JP); Huei Ee Yap, Tokyo (JP)

(73) Assignee: LP-Research Inc., Tokyo (JP)

( * ) Notice: Subject to any disclaimer, the term of this patent is extended or adjusted under 35 U.S.C. 154(b) by 322 days.

(21) Appl. No.: 15/610,036

(22) Filed: May 31, 2017

(65) Prior Publication Data

US 2018/0352282 A1 Dec. 6, 2018

(51) Int. Cl.
*H04N 21/414* (2011.01)
*A63F 13/28* (2014.01)
*H04N 21/478* (2011.01)
*H04N 21/422* (2011.01)

(52) U.S. Cl.
CPC .......................... *H04N 21/41422* (2013.01)

(58) Field of Classification Search
USPC .......................................................... 701/36
See application file for complete search history.

(56) References Cited

U.S. PATENT DOCUMENTS

| | | |
|---|---|---|
| 5,495,576 A | 2/1996 | Ritchey |
| 5,707,237 A | 1/1998 | Takemoto et al. |
| 7,246,050 B2 | 7/2007 | Sheridan |
| 7,920,071 B2 | 4/2011 | Baillot |
| 9,435,652 B2 | 9/2016 | Ralston et al. |
| 2015/0097861 A1 | 4/2015 | Alaniz et al. |
| 2015/0202962 A1 | 7/2015 | Habashima et al. |
| 2015/0321606 A1* | 11/2015 | Vartanian ........... G02B 27/0101 348/148 |
| 2016/0195407 A1 | 7/2016 | Sasaki |
| 2017/0136842 A1* | 5/2017 | Anderson ............. B60K 35/00 |
| 2018/0352282 A1* | 12/2018 | Lin .................. H04N 21/41422 |

FOREIGN PATENT DOCUMENTS

| | | |
|---|---|---|
| EP | 2608153 A1 | 12/2011 |
| JP | 2005067483 A | 3/2005 |
| JP | 2015074426 A | 4/2015 |
| WO | 2016079476 A1 | 5/2016 |

OTHER PUBLICATIONS

PCT Patent Application No. PCT/IB2017/053216 International Search Report and Written Opinion dated Sep. 5, 2017.

* cited by examiner

*Primary Examiner* — Tyler D Paige
(74) *Attorney, Agent, or Firm* — Erise IP, P.A.

(57) ABSTRACT

Media, method and system for augmenting media through automotive motion. Embodiments of the invention broadly receive media control inputs from a user consuming media, determine a vehicle behavior corresponding to the media control input and, if it is feasible to do so, actuate one or more vehicle controls to implement a vehicle behavior corresponding to the media control input. For example, if the user navigates their in-game avatar left, the vehicle may implement a corresponding lane change to the left. Embodiments of the invention may also augment the presentation of the media based on the sensed conditions of the vehicle.

20 Claims, 4 Drawing Sheets

MEDIA AUGMENTATION THROUGH AUTOMOTIVE MOTION

BACKGROUND

1. Field

Embodiments of the invention generally relate to presentation of in-vehicle media and, more specifically, to the use of vehicular motions to augment the media content being presented.

2. Related Art

Traditionally, some occupants of vehicles are responsible for operating the vehicle and others are free to pass the time by, for example, consuming media or playing video games. However, the operation of the vehicle has always remained separate from the media being consumed at least because it is unsafe for the operator of the vehicle to be also consuming the media. However, advances in vehicular automation have had two effects. First, the vehicles can be operated for extended periods with no need for operator attention. Second, the actuation of the controls of the vehicle is done automatically by route planning algorithms.

Based on these two factors, the presentation of entertainment media in a vehicle can be enhanced during a journey by augmenting the media content with the motions of the vehicle, such as acceleration, deceleration, lane changes, and turns. By synchronizing the motion of the vehicle with the content of the media (and vice versa), user immersion can be improved and motion sickness reduced.

SUMMARY

Embodiments of the invention address the above-described scenario by providing for techniques for augmenting media via vehicular motion. In particular, in a first embodiment, the invention includes one or more non-transitory computer-storage media storing computer-executable instructions that, when executed by a processor, perform a method of augmenting media based via vehicle motions, the method comprising the steps of receiving, from a user in a vehicle, a media control input via an interface device, controlling media being presented to the user in accordance with the media control input, mapping the media control input to a vehicle behavior, actuating one or more controls of the vehicle so as to implement the vehicle behavior, receiving data, from one or more sensors in the vehicle, regarding vehicle conditions, mapping the vehicle conditions to a media augmentation for the media being presented to the user, and augmenting the media being presented to the user in accordance with the mapping.

In a second embodiment the invention includes a method of augmenting media based via vehicle motions comprising the steps of receiving, from a user in a vehicle, a media control input via an interface device, controlling media being presented to the user in accordance with the media control input, mapping the media control input to a vehicle behavior, and actuating one or more controls of the vehicle so as to implement the vehicle behavior.

In a third embodiment, the invention includes a system for use in a vehicle to augmenting media based via vehicle motions, comprising a media engine, a mapping engine, and a vehicle behaviors interface, wherein the media engine is programmed to present, to a user, media content, receive, from the user, a media control input, control the media in accordance with the control input, and communicate, to the mapping engine, the control input, wherein the mapping engine is programmed to determine, based on the control input, a corresponding vehicle behavior, and communicate, to the vehicle behaviors interface, the vehicle behavior, and wherein the vehicle behaviors interface is programmed to determine whether the vehicle behavior is feasible, and if the vehicle behavior is feasible, actuate one or more controls of the vehicle to implement the vehicle behavior.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Figure 1:
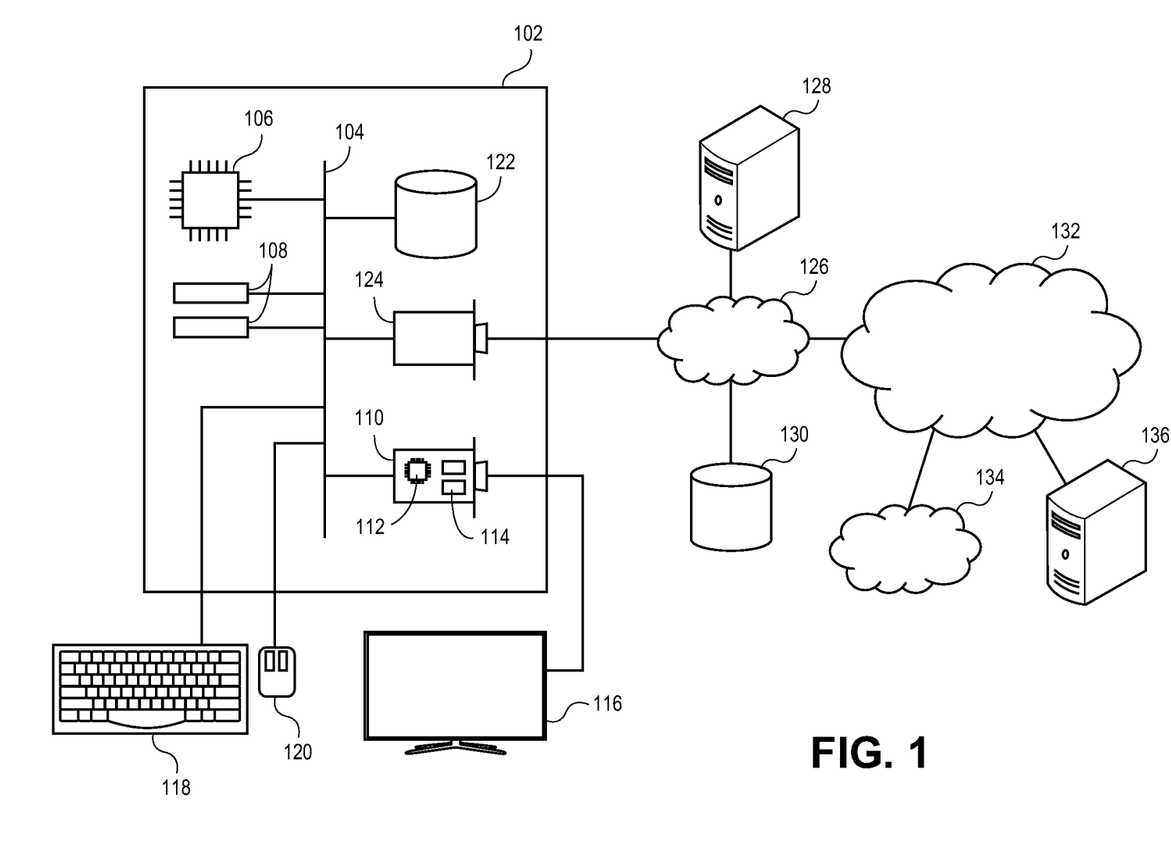
FIG. 1 depicts an exemplary hardware platform for certain embodiments of the invention.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
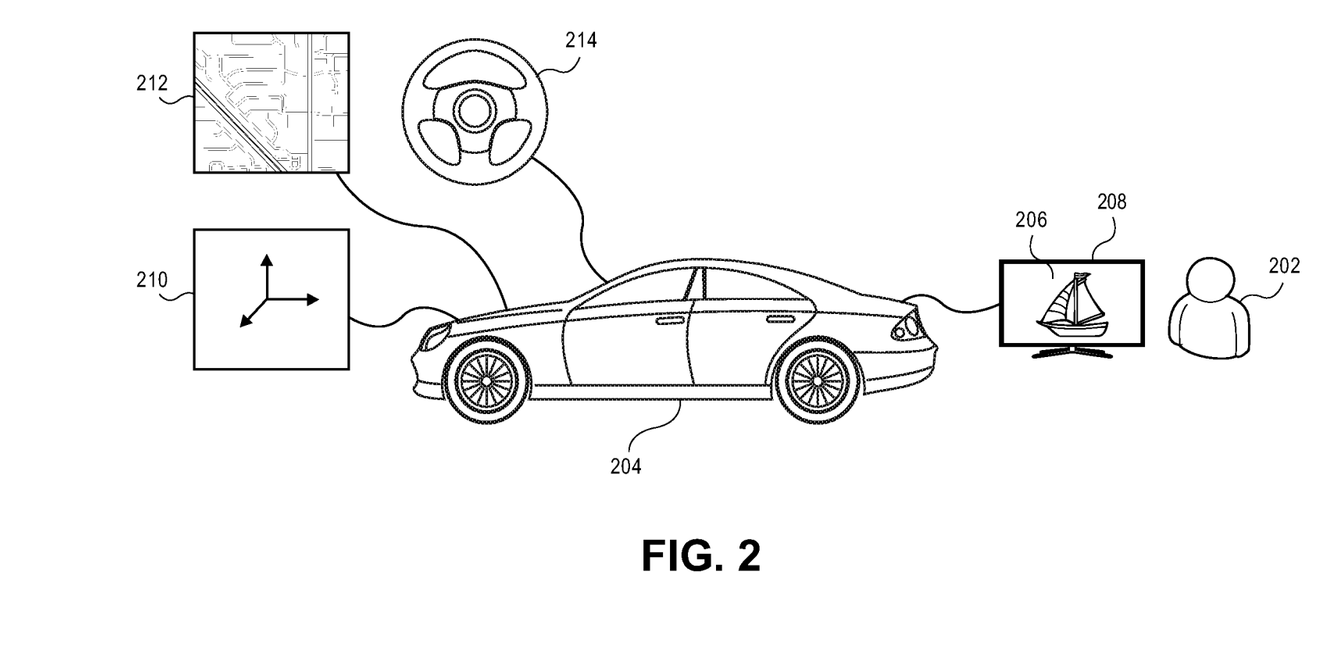
FIG. 2 depicts a block diagram showing certain components of an operational environment suitable for embodiments of the invention.

Turning now to FIG. 2, a block diagram showing certain components of an operational environment suitable for embodiments of the invention is depicted and referred to generally by reference numeral 200. Broadly speaking, user 202 is an occupant of vehicle 204. Vehicle 204 is one example of a platform suitable for embodiments of the invention. For example, vehicle 204 may be a car, truck, sport utility vehicle, or any other form of transportation. In some embodiments, vehicle 204 may instead be an airplane, train, boat, or other method of transportation. Broadly speaking, any form of public or private conveyance is contemplated as being within the scope of the invention. Vehicle 204 may be a conventional (driver-operated) vehicle, or an autonomous (self-driving) vehicle, or a hybrid of the two (for example, a partially autonomous vehicle requiring a driver presence but only limited activity or supervision).

Vehicle 204 has one or more occupants such as user 202. Broadly speaking, user 202 may be a driver or a passenger of vehicle 204. In some embodiments, vehicle 204 is autonomous or partially autonomous (and therefore has no driver). In some embodiments, vehicle 204 has no passengers. In other embodiments, vehicle 204 has a plurality of passengers. Broadly speaking, embodiments of the invention can be used whenever vehicle 204 has at least one occupant of any type to serve as user 202. In some embodiments, an occupant of vehicle 204 may be user 202 at a first point in time during a trip and a different occupant at a later point in time. Similarly, in embodiments where multiple occupants can simultaneously be user 202, an occupant may be in the group of users 202 at a first point in time, leave the group of users 202 at a second point in time, and rejoin the group of users 202 at a third point in time. For example, where vehicle 204 is a partially autonomous vehicle, the attention of an occupant designated as driver may be required for some (e.g., the non-highway portion) of a drive. In such a case, the driver can be a member of the group of users 202 during the highway portions of the drive and drop out of the group when their attention is required for driving vehicle 204. For the sake of brevity, the term "user" will be employed herein; however, embodiments of the invention contemplate a plurality of users in addition to a single user.

Media 206 is presented to user 202 via interface 208. Broadly speaking, interface 208 can be any form of input, output, or input/output device. For example, interface 208 can include one or more displays for presenting visual information (e.g., video) to user 202. Interface 208 may also include speakers for presenting an audio component of media 206 to user 202, scent reservoirs and dispersal nozzles for presenting scents to user 202, haptic actuators for presenting forces, vibrations, or motions to user 202, and any other form of output device. Input devices such as keyboards, mice, touch screens, dedicated controllers (e.g., game controllers), motion sensors, and force-feedback devices can also be used. One of skill in the art will appreciate that any or all of these devices can be used in combination. For example, a head-mounted virtual-reality display might include headphones and be combined with a seat-mounted haptic rumble unit and one or more motion-sensitive handheld control units.

Media 206 can be passive or interactive. Broadly speaking, passive media (such as movies or music) presents essentially the same content without regard to any user input. Passive media does not necessarily present the same content every time, however. For example, an animated fish tank can incorporate pseudo-random variations in fish behavior. As described in greater detail below, passive content may also be affected by outside sources, such as vehicular motion. For example, a simulated boat tour could feature boat motion synchronized to motion of a car in which user 202 is riding.

By contrast, active media such as video games are broadly controlled by input from user 202. Similarly, non-game media can be controlled by user input. For example, a boat tour simulator can allow the user to control the path of the simulated boat without any concept of scoring or winning. Like passive media, active media can be impacted by outside sources of data in addition to user input, such as vehicular motion or other ambient phenomena.

In order to augment media 206 with relevant ambient phenomena, embodiments of the invention include one or more sources of data relating to current or future vehicle conditions. For example, in some embodiments, the invention includes one or more accelerometers 210 for determining current automotive motion. In other embodiments, acceleration data is instead gathered via a global-positioning receiver or other location-determining component. Similarly, other sensors can collect data on other vehicle conditions in order to augment media 206. For example, a light-sensor could determine the current light levels to determine a simulated time-of-day for media 206. Broadly speaking, any form of sensors or transceiver is contemplated as being usable to augment media 206.

In addition to sensors to gather data on current vehicle conditions, embodiments of the invention may incorporate anticipated and/or predicted phenomena. For example, if vehicle 204 is a partially or fully autonomous vehicle, then route planner 212 may be used to determine the future route for vehicle 204, which can in turn be used to identify upcoming turns that will result in lateral acceleration. For non-autonomous vehicles, an integrated navigation system can be used to similarly identify upcoming maneuvers.

Similarly, data about (or from) other nearby vehicles can be used to predict upcoming maneuvers. For example, the adaptive cruise control system for a vehicle may include ultrasonic or radar sensors to detect nearby vehicles an automatically apply the brakes. By integrating with such a system, embodiments of the invention can anticipate braking before it occurs and incorporate the resulting acceleration into media 206. As another example, vehicles may communicate (e.g., via a vehicle-to-vehicle network) with other, nearby vehicles about traffic conditions. If vehicle 204 receives such a communication indicating that traffic congestion ahead will require braking, then this data can also be used to augment media 206.

As yet another source of information about current and future vehicle conditions, some embodiments of the invention may integrate with vehicle controls 214. In some embodiments, data from vehicle controls 214 is used to provide data about upcoming movements of the vehicle over a short time horizon. For example, if a driver of vehicle 204 steps on the brake, embodiments of the invention can begin to incorporate the resulting deceleration into media 206 even before the brake pedal has been depressed far enough to actually engage the brakes. Similarly, if the driver fully depresses the accelerator, it can be anticipated that high acceleration is forthcoming and that acceleration can be incorporated before the engine begins to respond.

In some embodiments, media 206 can also provide inputs to vehicle controls 214. For example, subtle control inputs may be applied to vehicle to provide motion compatible with the images displayed in media 206, thereby reducing motion sickness. Alternatively, user inputs in a game context can be incorporated into autonomous vehicular motion to increase player involvement. For example, if a user actuates a control causing their in-game avatar to jump, this could (conditions permitting) be mapped to an acceleration of the vehicle. Similarly, if the user moves or aims to the left, a lane change could be executed. In some embodiments, the reaction of user 202 to a particular mapping of game input to vehicular motion can be monitored and mappings updated accordingly. For example, vehicle 204 could incorporate one or more cameras oriented so as to capture imagery of the face of user 202. If, after user 202 inputs a particular command that is mapped to a particular vehicle behavior, the face of user 202 consistently indicates a negative emotion (sadness, anger, confusion, nausea, etc.), then the mapping from the input to the vehicular behavior can be altered or removed. Mappings from control inputs to vehicle behaviors and from vehicle behaviors to media augmentations are described in greater detail below.

Figure 3:
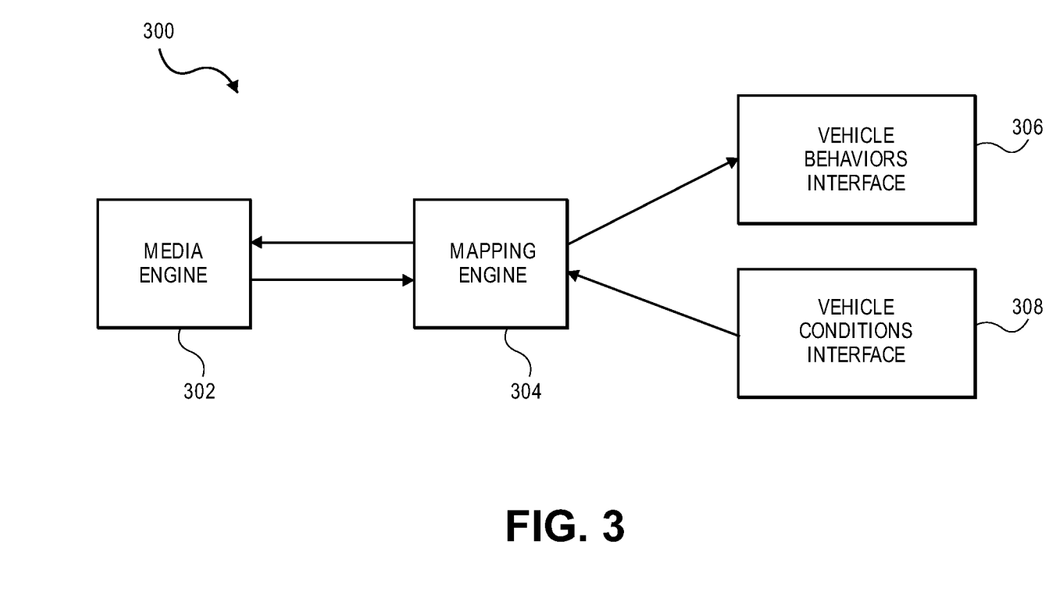
FIG. 3 depicts a block diagram illustrating the high-level components of a system embodying the invention.

Turning now to FIG. 3, a block diagram illustrating the high-level components of a system embodying the invention is depicted and referred to generally by reference numeral 300. Broadly speaking, media engine 302 is responsible for presenting media to user 202. For example, media engine 302 may be an in-car entertainment system. As discussed above with respect to interface 208, a variety of media may be presented alone or in combination to present varying levels of immersion for user 202. For example, a small display screen can present a view of a simulated fish tank while requiring minimum attention from user 202. At the other end of the spectrum, a head-mounted display with in-ear speakers and in-seat haptic feedback may provide a high level of immersion for a user playing a video game.

In addition to presenting media to user 202, it is a function of media engine 302 to communicate with mapping engine 304. As described above, in some embodiments, user inputs can affect vehicle behaviors. In such embodiments, control inputs from user 202 are passed to mapping engine 304 to determine whether any vehicle behaviors should be affected. In other embodiments, vehicle conditions may impact media 206 as it is presented to user 202. In such embodiments, media augmentations (as mapped from vehicle conditions by mapping engine 304) are received by media engine 302. In still other embodiments, user inputs affect vehicle behaviors and vehicle conditions affect the presentation of media 206 to user 202. In such embodiments, user inputs can be passed to mapping engine 304, media augmentations can be received from mapping engine 304, or both.

Communicatively coupled to media engine 302 is mapping engine 304. Mapping engine 304 is responsible for converting user inputs into vehicle behaviors and/or vehicle conditions into media augmentations. Mappings will, in general, be specific to the media. As one example, in the case of a simulated fish tank given above, accelerometer data for the car could be mapped to acceleration data for the fish tank so that the water and fish responded appropriately to the vehicular motion by, for example, sloshing realistically. As a more complicated example, if the user is playing a video game that simulates surfing, anticipated vehicle motion (as determined by, for example, a route planner for vehicle 204) can be used to determine the sequence of waves presented to user 202. Thus, for example, if mapping engine 304 determines that braking is imminent, it can present a wave head-on to the user which (if encountered while surfing) would result in a similar deceleration. Similarly, acceleration might be represented by an incoming wave which user 202 can surf down, thereby speeding up their in-game avatar as the vehicle speeds up. Other, non-visual augmentations are contemplated as well. For example, vehicle 202 accelerating from a stop might be mapped to a rocket blasting off, with accompanying visual images (a view from the cockpit of the rocket), sound (engine roar) and tactile feedback (rumble from in-seat haptic units).

One of skill in the art will appreciate that some such mappings can also be used in reverse, such that a user surfing down a wave (for example) would cause vehicle 204 to accelerate and so forth. In other embodiments, control mappings are less literal. For example, if user 202 causes their in-game avatar to jump, this could be represented by a brief acceleration, a brief deceleration, or any other vehicle behavior. Similarly, user 202 moving their ship to the left or right in a fixed shooter (such as Space Invaders) could be mapped to vehicle 204 executing a lane change to the left or to the right.

In some embodiments, mappings between user inputs and vehicle behaviors (and between vehicle conditions and media augmentations) are predetermined. In other embodiments, however, these mappings may be updated or changed based on user response. For example, user 202 may be playing a automobile racing game, with control inputs mapped (in appropriately scaled-down form) to actual vehicle behaviors. Thus for example, if user 202 causes their in-game vehicle to accelerate, then vehicle 204 would also accelerate (to a reduced degree). However, if the response of vehicle 204 to in-game inputs is too strong, it could result in a jerky or otherwise uncomfortable ride for user 202. As such, such a mapping may have an adjustable damping factor that controls the degree to which user inputs are mapped to vehicle behaviors. Thus, if user 202 is uncomfortable, they can increase the damping factor to improve the smoothness of the ride. In other embodiments, as mentioned above, mapping engine 304 may automatically monitor user response to actuated vehicle behaviors and tune the response accordingly.

In other embodiments, the most appropriate vehicle behavior for a particular user input is automatically determined. For example, a predetermined set of vehicle behaviors may be available, such as speed up, slow down, change lanes, blip throttle, tap brakes, and so on. Similarly, a predetermined set of control inputs may be available, such as up, down, left, right, button 1, button 2, and so on. Each control input may have a ranked list of vehicle actions. For example, such a list for the "button 1" input might include "speed up," "blip throttle," "slow down," and "tap brakes," in that order. Then, based on user response to the vehicle action for a given control input, vehicle actions can be weighted more highly or less highly. Although this specification discusses vehicle behaviors as discrete individual behaviors, embodiments may construct complex behaviors by combining and/or blending individual behaviors. For example, the "left" control input could be mapped to "accelerate at 30% throttle, while changing lanes to the left, then tap brakes." One of skill in the art will appreciate that machine learning techniques can be used to determine optimal vehicle behaviors for a given control input in a particular media context (e.g., particular application or game) based on observed user reactions from a variety of biometric sensors including cameras, skin-conductivity sensors, pulse monitors, pupillary response meters, and so forth.

Also communicatively coupled to mapping engine 304 are vehicle behaviors interface 306 and vehicle conditions interface 308. Broadly speaking, vehicle behaviors interface 306 receives proposed vehicle behaviors from mapping engine 304, determines whether they are feasible, and (if so) activates vehicle controls so as to implement them. For example, the user may have actuated the "left" control input for a particular piece of media, which mapping engine 304 determines should cause a lane change to the left. Vehicle behaviors interface 306 must first determine whether this behavior is feasible. For example, in order to implement a lane change to the left, vehicle 204 must not be traveling in the leftmost lane and there must not be a vehicle in the lane immediately to the left for a safe margin in front of and behind vehicle 204. Similarly, if mapping engine 304 proposes a sharp tap of the brakes, there must not be a vehicle immediately behind vehicle 204, the road conditions must be good (for example, the road must dry and well maintained) and if mapping engine 304 proposes an acceleration, vehicle 204 must not already be traveling at the speed limit. One of skill in the art will appreciate that such feasibility checks are similar to those performed by the route planner of an autonomous vehicle in the course of normal driving. If the proposed vehicle behavior is feasible, then vehicle behaviors interface 206 can actuate the controls of vehicle 204 appropriately to implement the behavior. In some embodiments, vehicle behaviors interface 306 is integrated into an autonomous controller for an autonomous vehicle. In other embodiments, vehicle behaviors interface 306 sends control inputs to the route planner for the vehicle. In still other embodiments, vehicle behaviors interface 306 supplements vehicle control inputs 214 as operated by a driver of vehicle 204.

Vehicle conditions interface 308 is responsible for aggregating current conditions data from vehicular sensors such as accelerometers 210, future actions from route planner 212, and all other data regarding the ambient conditions of vehicle 308. This data can be passed to mapping engine 304 for conversion into media augmentations. Thus, as described above, a current acceleration can be incorporated into media 206 as it is being presented to user 202 (for example, the simulated fish tank can slosh in time with the movements of vehicle 204), and anticipated future movements of the vehicle can be used to plan for future augmentations of media (for example, an upcoming turn could cause an obstacle to be generated in a video game that would cause user 202 to cause their in-game avatar to turn in the same way at the same time, thereby synchronizing the movement of the vehicle with the in-game actions).

Figure 4:
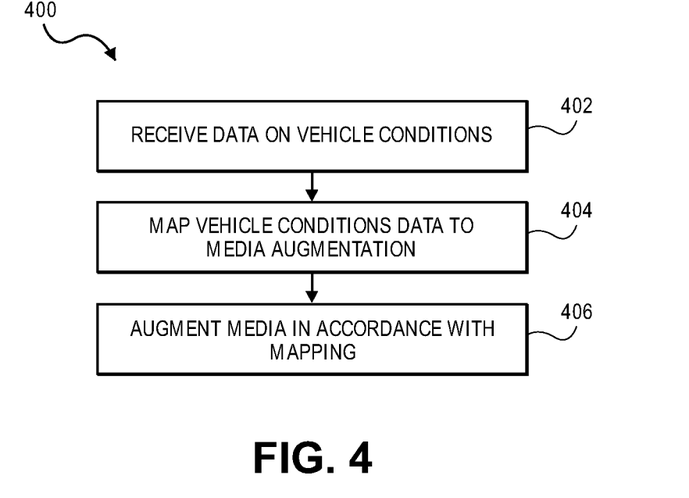
FIG. 4 depicts a flowchart illustrating the operation of a method in accordance with embodiments of the invention.

Turning now to FIG. 4, a flowchart illustrating the operation of a method in accordance with embodiments of the invention is depicted and referred to generally by reference numeral 400. Initially, at a step 402, the system receives data regarding the conditions of vehicle 204. In some embodiments, this data regards the current conditions of vehicle 204. In other embodiments, this data regards future conditions of vehicle 204. In still other embodiments, this data includes both current conditions and anticipated future conditions of vehicle 204. Broadly speaking, the data can concern any aspect of the vehicle. As described above, acceleration data is one example of vehicle conditions data. However, other types of data are also contemplated. For example, the anticipated time of arrival of vehicle 204 at its destination can be used to affect the pacing of media 206 so as to synchronize its conclusion with the arrival. Temperature, light level, traffic conditions, ambient sounds, and other data can also be examples of vehicle conditions data.

Next, at step 404, the vehicle conditions data is mapped to one or more media augmentations. As described above, data can be mapped into media augmentations differently depending on the particular type of vehicle conditions data and on the type of media being augmented. Various examples of mapping are described herein; however, one of skill reviewing this disclosure will understand that a wide variety of mappings are possible, and all such mappings are contemplated as being within the scope of the invention. The same vehicle conditions data can also be mapped to multiple media augmentations simultaneously. For example, in a simulated boat ride, a deceleration by vehicle 204 could be mapped to both an incoming wave (causing the simulated boat to slow) and to an increase in simulated wind (represented by other waves being displayed and an increase in a fan setting of the climate control of vehicle 204).

Processing can then proceed to a step 406, where the media 206 being presented to user 202 is augmented in accordance with the mapping determined at step 404. Broadly speaking, media augmentations can be made in any aspect of the media being presented or in an aspect not included in the media prior to augmentation. For example, as described above, a simulated boat ride can be augmented by wind in the existing video aspect (by adding waves to the surrounding water) or in the existing audio aspect (by adding the sound of wind to the audio track); however, it can also be augmented in a tactile aspect not included in the unaugmented simulation (by increasing the speed of the fans of the climate control system of vehicle 204).

Figure 5:
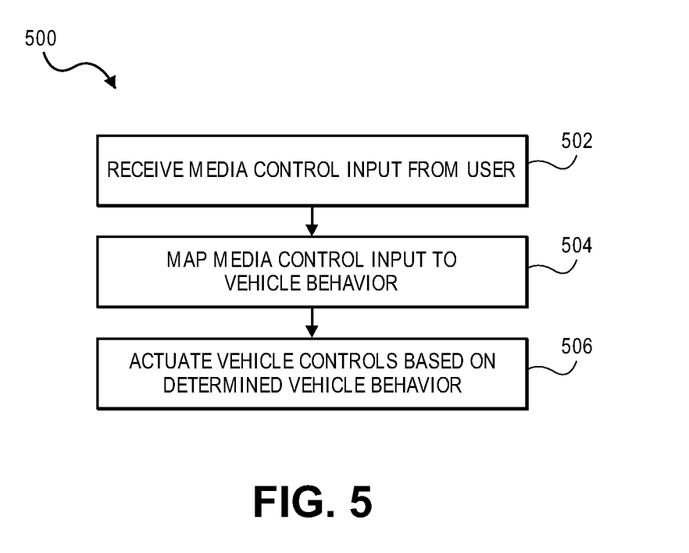
FIG. 5 depicts a flowchart illustrating the operation of another method in accordance with embodiments of the invention.

Turning now to FIG. 5, a flowchart illustrating the operation of another method in accordance with embodiments of the invention is depicted and referred to generally by reference numeral 500. In some embodiments, it is envisioned that method 400 and method 500 will be employed in concert, thereby closing the loop between the commands of user 202, the behavior of vehicle 204, and back to the experiences of user 202. Initially, at a step 502, one or more media control inputs are received form a user such as user 202. These inputs can be first processed as usual to control the media as directed by user 202. As described above with respect to interface 208, user 202 can use any of a variety of control methodologies to provide control inputs. For example, user 202 may speak voice commands that are recognized via a voice recognition system. Alternatively, a user can use a conventional video game controller to play a video game, or a media-specific controller (such as a steering wheel for a racing game). Alternatively, one or more vehicle controls can be repurposed as media control inputs when vehicle 204 is in autonomous mode. For example, instead of a dedicated steering wheel controller to control a racing game, the steering vehicle of vehicle 204 can be used when it is not required for controlling vehicle 204.

Next, at step 504, the control input is mapped to one or more vehicle behaviors. As described above, vehicle behaviors can be static and predetermined or learned based on observations of user 202 when trial mappings are used. In some embodiments, mappings translate actions intended by the user in the media context as closely as possible to motions actuated by the car. Thus, for example, a control input instructing the in-game avatar to move left would also cause vehicle 204 to move left (by, for example, changing lanes), and a control input instructing the avatar to jump could cause vehicle 204 to momentarily accelerate. As discussed above, in some embodiments, multiple vehicle behaviors can be combined or sequenced in response to a single control input.

Processing can then proceed to step 506, where the controls of vehicle 204 are actuated based on the vehicle behavior or behaviors determined at step 504. In some embodiments, the desired vehicle behavior is passed to a route planner in order to verify that the desired behavior is feasible (e.g., that it will not unduly interfere with other traffic or cause a loss of control for vehicle 204). Where vehicle 204 is autonomous (or is partially autonomous), these control inputs can be processed together with other control inputs from the route planner. Where vehicle 204 is not autonomous, these commands can be processed in the same way as driver inputs received via vehicle controls 214. One of skill in the art will appreciate that these control actuations will change the vehicle conditions (for example, by generating an acceleration in some direction), which can then be used to augment the media in accordance with method 400.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-storage media storing computer-executable instructions that, when executed by a processor, perform a method of augmenting media based via vehicle motions, the method comprising the steps of:
   receiving, from a user in a vehicle, a media control input via an interface device;
   controlling media being presented to the user in accordance with the media control input;
   mapping the media control input to a vehicle behavior;
   determining that the vehicle behavior is feasible;

actuating one or more controls of the vehicle so as to implement the vehicle behavior;

receiving data, from one or more sensors in the vehicle, regarding vehicle conditions;

mapping the vehicle conditions to a media augmentation for the media being presented to the user; and augmenting the media being presented to the user in accordance with the mapped vehicle conditions.

2. The media of claim 1, wherein the media is a video game.

3. The media of claim 1, wherein the vehicle behavior is an acceleration.

4. The media of claim 1, wherein the vehicle behavior is a lane change.

5. The media of claim 1, wherein the one or more sensors include an accelerometer.

6. The media of claim 1, wherein the vehicle conditions result from the vehicle behavior.

7. The media of claim 1, wherein the vehicle conditions include anticipated future vehicle conditions.

8. A method of augmenting media based via vehicle motions comprising the steps of:

receiving, from a user in a vehicle, a media control input via an interface device;

controlling media being presented to the user in accordance with the media control input;

mapping the media control input to a vehicle behavior;

determining that the vehicle behavior is feasible;

actuating one or more controls of the vehicle so as to implement the vehicle behavior.

9. The method of claim 8, wherein the interface device is a video game controller.

10. The method of claim 8, wherein the vehicle behavior is a deceleration.

11. The method of claim 8, wherein the step of actuating one or more controls of the vehicle comprises actuating a plurality of controls of the vehicle.

12. The method of claim 8, further comprising the steps of:

receiving data, from one or more sensors in the vehicle, regarding vehicle conditions;

mapping the vehicle conditions to a media augmentation for the media being presented to the user; and augmenting the media being presented to the user in accordance with the mapped vehicle conditions.

13. The method of claim 8, wherein the vehicle conditions include an acceleration resulting from the step of actuating the one or more vehicle controls.

14. The media of claim 8, wherein a visual component of the media being presented to the user is augmented.

15. A system for use in a vehicle to augmenting media based via vehicle motions, comprising:

a media engine;
a mapping engine; and
a vehicle behaviors interface,
wherein the media engine is programmed to:
present, to a user, media content;
receive, from the user, a media control input;
control the media in accordance with the control input; and
communicate, to the mapping engine, the control input,
wherein the mapping engine is programmed to:
determine, based on the control input, a corresponding vehicle behavior; and
communicate, to the vehicle behaviors interface, the vehicle behavior, and
wherein the vehicle behaviors interface is programmed to:
determine whether the vehicle behavior is feasible based at least in part on information indicative of vehicle surroundings; and
if the vehicle behavior is feasible, actuate one or more controls of the vehicle to implement the vehicle behavior.

16. The system of claim 15, wherein the media content is a video game.

17. The system of claim 15, wherein:
the mapping engine is further programmed to determine a media augmentation based on a vehicle condition; and
the media engine is further programmed to augment the media content based on the media augmentation determined by the mapping engine.

18. The system of claim 17, wherein the vehicle surroundings is at least one of road conditions, lane conditions, other vehicles, and speed limit.

19. The system of claim 18, wherein the acceleration is generated by the step of actuating of the one or more controls of the vehicle.

20. The system of claim 15, wherein the vehicle behavior is a lane change.

* * * * *